Oct. 6, 1970 A. J. POMMER 3,531,981
TEST APPARATUS TO DETECT RESTRICTION IN THE
BRAKE PIPE OF RAILWAY BRAKE SYSTEMS
Filed Dec. 27, 1968

INVENTOR.
ANDREW J. POMMER
BY
*A. A. Steinmiller*
ATTORNEY

United States Patent Office 3,531,981
Patented Oct. 6, 1970

3,531,981
TEST APPARATUS TO DETECT RESTRICTION IN
THE BRAKE PIPE OF RAILWAY BRAKE SYSTEMS
Andrew J. Pommer, Pittsburgh, Pa., assignor to Westinghouse Air Brake Company, Wilmerding, Pa., a corporation of Pennsylvania
Filed Dec. 27, 1968, Ser. No. 787,313
Int. Cl. G01n 19/08
U.S. Cl. 73—39    5 Claims

ABSTRACT OF THE DISCLOSURE

A test apparatus to detect a restriction to the flow of fluid under pressure through the brake pipe of a railway fluid pressure brake system which restriction is of sufficient size to prevent venting fluid under pressure from the brake system brake pipe at an emergency rate. This test apparatus embodies two restrictions placed in series in a brake pipe charging communication and a pressure responsive indicating means connected to this communication intermediate the two restrictions. An undesired restriction in the brake pipe causes an increase in the pressure in the charging fluid flowing between the two restrictions embodied in the test apparatus. The indicating means is operatively responsive to a pressure corresponding to a brake pipe restriction sufficient to prevent flow of fluid under pressure through the brake pipe at an emergency rate. Operation of the pressure-responsive indicating means to an indicating position apprises an observer that a reduction of the pressure in the brake pipe at an emergency rate cannot be obtained.

BACKGROUND OF THE INVENTION

The fluid pressure brake equipment on every railway car includes a brake pipe that extends from end to end of the car. An angle cock is secured to each end of the brake pipe at a corresponding end of the car. These angle cocks and other elements used to make up the brake pipe are castings having cored passageways therein. In the production of such castings, the sizes of the passageways therein often are greater or less than that desired. When the size of such passageways are less than that desired, these passageways constitute restrictions to the flow of fluid under pressure through the brake pipe from one end of the car to the other.

Furthermore, the hose secured to the respective angle cock at each end of the car can become bent or twisted which inhibits or restricts the flow of fluid under pressure therethrough. Also, a piece of track ballast or other contaminant, by accident, may enter the opening in the hose coupling at the end of the hose opposite the end secured to the angle cock. The entrance of such a contaminant would likewise inhibit or restrict the flow of fluid under pressure.

The brake pipe extending between the two angle cocks at the respective opposite ends of the car often comprises two or more sections of pipe the adjacent ends of which are secured together by a welding operation. In the performance of these welding operations, the molten metal from the welding rod used may adhere to the inside wall of the pipe and thereafter solidify, thereby reducing the cross-sectional area of the pipe opening and thus forming a restriction that is effective to reduce the rate of flow of fluid under pressure through the brake pipe.

Accordingly, it is apparent that one or a number of the above-mentioned restrictions could so inhibit the flow of fluid under pressure through the car brake pipe as to prevent a rapid or emergency rate of flow of fluid under pressure through this brake pipe, thereby rendering the car brake equipment inoperative to effect an emergency brake application on the car.

It is the general purpose of this invention to provide a simple and inexpensive test apparatus to detect that the brake pipe on a single railway car is sufficiently restricted to prevent flow of fluid under pressure therethrough at an emergency rate.

SUMMARY OF THE INVENTION

According to the present invention, a conventional freight-type single car testing device is modified first; by reducing the size of one of the supply passageways in the rotary valve of the test valve device from, for example, .250 inch in diameter to, for example, .1875 inch in diameter to provide a better control of the fluid under pressure supplied to effect charging of the brake equipment on a single freight car, and secondly; by the addition of a restriction or choke having a diameter of, for example, .375 inch in the communication between the outlet of the test valve device and the brake pipe on the freight car, and a pressure-responsive indicator device connected to the upstream side of this additional restriction. These modifications and additions to the conventional freight-type single car testing device provide means whereby this modified testing device is able to indicate or determine that the brake pipe on a single car has sufficient internal restrictions to prevent flow of fluid under pressure through this brake pipe at an emergency rate and, therefore, that the operation of the fluid pressure brake equipment on the car to effect an emergency brake application is impaired or prevented. Restriction of the car brake pipe sufficient to prevent the flow of fluid under pressure therethrough at an emergency rate will cause the pressure in the delivery line or communication extending between the test valve device and the restriction or choke having a diameter of .375 inch and, therefore, on the upstream side of this choke, to increase to the value necessary to cause operation of the indicator device.

Figure 1:
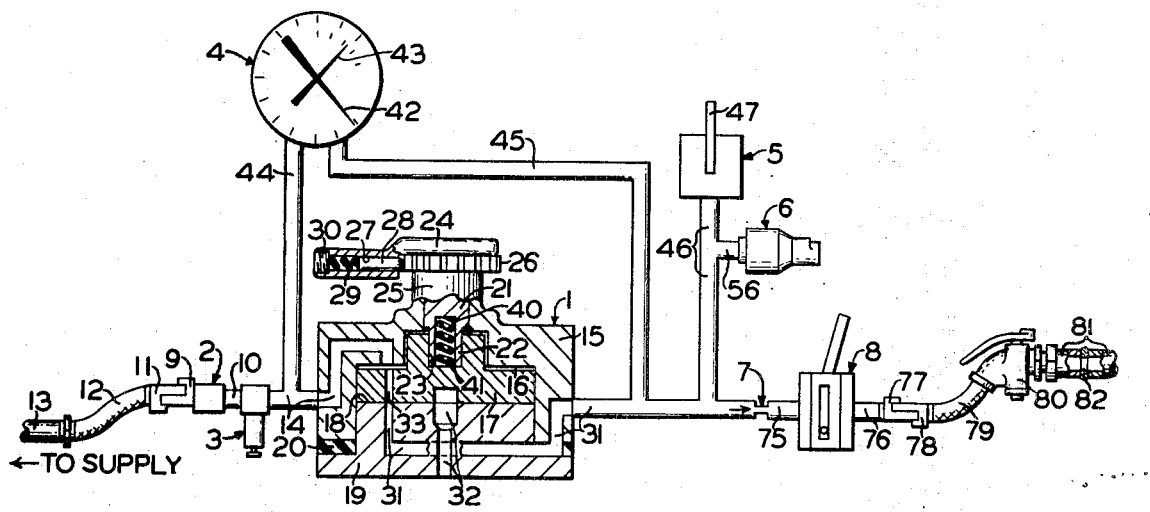
FIG. 1 is a diagrammatic view, partly in section, of a test apparatus constructed in accordance with the invention and embodying, in vertical section, a manually operative rotary valve device for controlling the supply of fluid under pressure to and the release of fluid under pressure from the brake pipe on a single railway car.

Referring to FIG. 1, the test apparatus provided by this invention comprises a manually operative rotary valve device 1, a strainer device 2, a reducing valve device 3, a duplex gage 4, an emergency cock or valve device 5, a brake pipe restriction indicator 6, a choke or restriction 7, and a fluid flow measuring device 8.

The strainer device 2 may be of the type shown and described in U.S. Pat. 2,014,895, issued Sept. 17, 1935, to Ellis E. Hewitt and assigned to the assignee of the present invention. This strainer device 2 comprises a pair of foraminous tubular members of substantially different diameters. The smaller of these members is mounted within the larger, while suitable air straining material, such as curled hair, is packed in the space between the tubular members. These tubular members are mounted in a sleeve member so as to form between the larger tubular member and the sleeve member a chamber that is open to a passage in a hose coupling 9, while the area or chamber within the smaller tubular member is connected by a short pipe 10 to the supply inlet of the reducing valve device 3.

The hose coupling 9 is coupled to an identical hose coupling 11 at one end of a hose 12 the opposite end of which is connected to one end of a pipe 13 leading from a source of fluid under pressure (not shown) which may be, for example, a yard charging plant in a railway yard or in a railway car builder's erection shop.

The reducing valve device 3 may be of the type shown and described in U.S. Pat. 1,633,728, issued June 28, 1927, to Clyde C. Farmer and assigned to the assignee of the present invention. Briefly, the reducing valve device 3 comprises a regulating portion and a supply portion and is operative to supply fluid at a constant predetermined pressure to the rotary valve device 1 via a pipe 14.

The rotary valve device 1 comprises a casing 15 having a chamber 16 to which the pipe 14 is connected by a correspondingly numbered passageway whereby this chamber 16 is adapted to be charged with fluid under pressure from the reducing valve device 3 to the above-mentioned constant predetermined value. Contained in the chamber 16 is a rotary valve 17 that cooperates with a valve seat 18 on a pipe bracket 19 separated from the casing 15 by a gasket 20 of some suitable resilient material such as rubber, the casing 15 being secured to the pipe bracket 19 by any suitable means (not shown). The rotary valve 17 is adapted to be operated by a rotary valve stem 21, the lower end 22 of which is tapered and of rectangular cross-section in order that it may be disposed in a correspondingly tapered slot 23 extending across the top of the rotary valve 17 to provide a driving connection therebetween. The upper end of the rotary valve stem 21 extends to the exterior of the casing 15. That portion of the stem 21 that is exterior of the casing 15 is substantially square in cross section, as is apparent in FIG. 4, for receiving a handle 24.

The casing 15 is provided with an upstanding portion 25 at the end of which and integral therewith is a cam 26 the periphery of which is provided with six grooves or indentations corresponding to six positions of the handle 24. Slidably mounted in a bore 27 in the handle 24 is a plunger 28 which is yieldingly urged into contact with the cam 26 by a spring 29 interposed between the left-hand end of the plunger 28 and a screw-threaded plug 30 that has screw-threaded engagement with internal screw-threads provided in the left-hand end of the bore 27 in the handle 24. Movement of the handle 24 from one position to another is resisted by the spring 29 as the right-hand end of the plunger 28 moves from one groove to another along the periphery of the cam 26 thereby giving an operator a sense of "feel" when the handle reaches the desired position.

Figure 3:
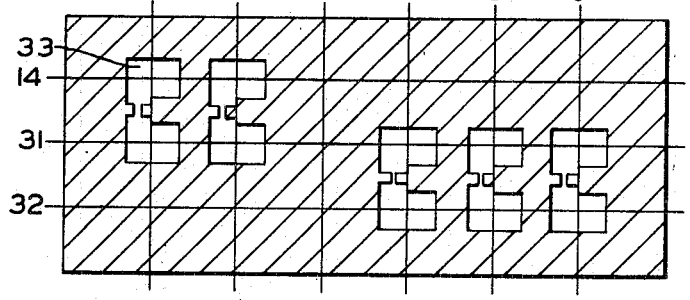
FIG. 3 is a diagrammatic view, in development form, of the communications established in the different positions of the manually operative rotary valve device shown in cross-section in FIG. 1.

As indicated in FIG. 3, the rotary valve 17 may be positioned in any one of six positions, one of which is shown in FIG. 1 and indicated in FIG. 3 as position No. 1 which it will be understood is a fast charging position in which fluid under pressure flows from the yard charging plant through the rotary valve device 1 to the brake pipe on the single car the brake equipment of which is being charged.

Opening at the valve seat 18 is a port 31 that is connected by a correspondingly numbered passageway and pipe to the inlet side of the choke or restriction 7, the diameter of which may be, for example, .375 inch. Also, opening at the valve seat 18 is a port 32 that is open to atmosphere via a correspondingly numbered passageway extending through the pipe bracket 19 and opening at the lower face thereof.

The rotary valve 17 is provided with a pair of arcuately-spaced drilled holes of different diameter the upper end of each opening into the chamber 16 above the rotary valve 17 and the lower end opening at the lower face of this rotary valve which lower face abuts the valve seat 18 on the pipe bracket 19.

While the rotary valve 17 occupies its No. 1 position in which it is shown in FIG. 1, the larger of these drilled holes, the diameter of which may be, for example, .1875 inch, in this rotary valve 17, which hole is indicated in FIG. 1 by the numeral 33, is in alignment with the port 31 in the valve seat 18. Consequently, while the rotary valve 17 occupies its No. 1 position in which it is shown in FIG. 1, fluid under pressure can flow at a maximum rate from the yard charging plant to the brake pipe on the car to effect charging of the brake equipment at this maximum rate.

Figure 4:
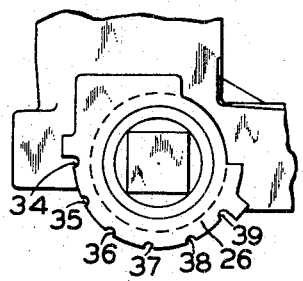
FIG. 4 is a plan view of the rotary valve device shown in FIG. 1 with the operating handle removed to more clearly show the details of the handle positioning cam.

The location of the above-mentioned pair of arcuately-spaced drilled holes extending through the rotary valve 17 is such that the smaller of these two drilled holes, the diameter of which may be, for example, .0225 inch, is moved into alignment with the port 31 in the valve seat as the plunger 28 in the handle 24 is correspondingly moved from the first or left-hand groove in the cam 26, and indicated in FIG. 4 by the reference numeral 34, to the second groove indicated by the reference numeral 35, as the handle 24 is manually rotated by an operator from its No. 1 position to its No. 2 position. In this No. 2 position of the handle 24 and rotary valve 17, fluid under pressure can flow at a slower or minimum rate from the yard charging plant to the brake pipe on the car to effect charging of the brake equipment at this minimum rate.

Manual movement of the handle 24 from its No. 2 position to its No. 3 position in which the plunger 28 in this handle is correspondingly moved from the second groove 35 in the cam 26 to a third groove indicated by the reference numeral 36 effects rotation of the rotary valve 17 to a third or lap position in which the valve seat 18 closes both of the ports 31 and 32 thereby preventing flow of fluid under pressure to and from the brake pipe on the car.

Opening at the center of the lower face of the rotary valve 17 is one end of a drilled hole that is coaxial with the atmospheric port 32 in the valve seat 18. The upper end of this drilled hole opens into a cavity (not shown) formed in the rotary valve 17 intermediate its upper and lower faces.

Also opening at the lower face of the rotary valve 17 is one end of three arcuately-spaced drilled holes, the diameters of which may be, for example, .035 inch, .078 inch and .147 inch, the upper end of which holes opens into the above-mentioned cavity in the rotary valve. The location of these three arcuately-spaced holes is such that their lower ends are moved sequentially into alignment with the port 31 in valve seat 18 as the handle 24 is moved sequentially from its No. 3 position to its No. 4, No. 5 and No. 6 positions respectively, it being understood that the plunger 28 is correspondingly moved sequentially into spaced-apart grooves 37, 38 and 39 provided in the cam 26 to define these handle positions. Consequently, it will be apparent that as the handle 24 is sequentially moved to its No. 4, No. 5 and No. 6 positions, fluid under pressure will be vented from the brake pipe on the car to atmosphere at three different rates, the minimum rate of venting being obtained while the handle 24 occupies its No. 4 position and the maximum rate of venting being obtained while this handle occupies its No. 6 position.

As shown in FIG. 1, the lower end 22 of the valve stem 21 is provided with a counterbore 40 and interposed between the upper end of this counterbore and the bottom of the slot 23 in the top of the rotary valve 17 is a spring 41 that is effective to bias the rotary valve 17 against the valve seat 18 on the pipe bracket 19.

The duplex gage 4 is provided with two pressure-indicating scales and two indicating pointers 42 and 43, one for each scale. The duplex gage 4 is in effect two gages and is connected respectively, to the pipe 14 intermediate the reducing valve device 3 and the rotary valve device 1 by a pipe 44, and to the pipe 31 intermediate the rotary valve device 1 and the choke or restriction 7 by a pipe 45. Consequently, the pointer 42 is effective to indicate the pressure supplied by the reducing valve device 3 to the chamber 16 in the rotary valve device 1, and the pointer 43 is effective to indicate the pressure in the pipe 31 on the upstream side of the choke or restriction 7.

The emergency cock or valve device 5 may be of the type shown and described in U.S. Pat. 2,054,909, issued Sept. 22, 1936 to Charles B. Morehouse. Briefly, the valve device 5 comprises a closing member or valve element in the form of a flexible diaphragm that is forced against an annular valve seat to close a passageway through the body of this valve device. This body has an inlet which is connected by a pipe 46 to the pipe 31 on the upstream side of the choke or restriction 7. A lever 47 may be swung to a closed position to cause seating of the flexible diaphragm on its annular seat thereby closing communication between the pipe 46 and atmosphere. This lever 47 can be swung to an open position in which the diaphragm may be unseated from its annular seat whereupon fluid under pressure can flow from the pipes 46 and 31 past the annular seat to atmosphere at an emergency rate to effect an emergency brake application on the car to which the test apparatus constituting the present invention is connected in a manner hereinafter described.

Figure 2:
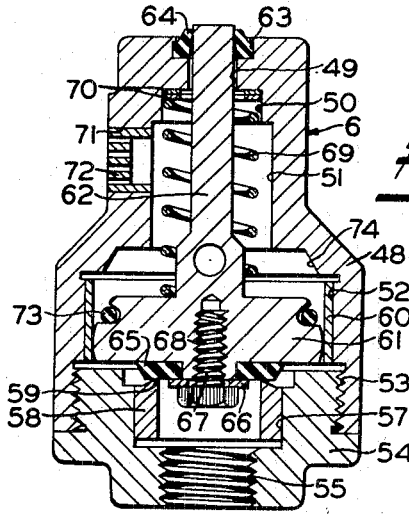
FIG. 2 is a cross-sectional view, on an enlarged scale, of a pressure-responsive indicating device shown in outline in FIG. 1.

The brake pipe restriction indicator 6 is shown in detail in FIG. 2 and comprises an inverted cup-shaped body 48 having a bore 49 that at its lower end opens into a first coaxial counterbore 50. This counterbore 50 is coaxial with three other counterbores 51, 52 and 53 of increasing diameter, the latter being provided with internal screw threads, for screw-threaded engagement with external screw threads formed on a cap member 54.

The cap member 54 is provided with a central screw-threaded bore 55 that receives one end of a pipe (FIG. 1) the other end of which is connected to the pipe 46 intermediate the ends thereof.

As shown in FIG. 2, the upper end of the screw-threaded bore 55 opens into a coaxial counterbore 57 into which is press-fitted a bushing 58 that has an annular valve seat 59 formed at its upper end.

Press-fitted into the above-mentioned counterbore 52 is a bushing 60 in which is slidably mounted a piston 61 having integral therewith an indicating stem 62 that extends from the upper face thereof and through the bore 49 to the exterior of the body 48. In order to prevent the entrance of contaminants to the interior of the body 48, this body is provided with a counterbore 63 that is coxial with the bore 49 and in which is received a resilient annular member 64 that is disposed about the upper end of the indicating stem 62.

As can be seen from FIG. 2, a resilient valve element 65 is secured to the lower face of the piston 61 by a washer 66 and a cap screw 67 that has screw-threaded engagement with a screw-threaded bottom bore 68 provided in the piston 61.

The resilient valve element 65 is normally biased against the valve seat 59 by a spring 69 that is disposed in surrounding relation to the indicating stem 62 and interposed between the upper face of the piston 61 and a spring seat in the form of a pair of annular discs or shims 70 disposed in the counterbore 50.

In order to prevent the compression of fluid by the piston 61 upon unseating of the valve element 65 from its seat 59, the body 48 is provided with a bore 71 into which is press-fitted an insect excluder device 72 that provides for the flow of fluid under pressure therethrough and also prevents the entrance of insects, such as, for example, mud wasps, into the interior of the body 48.

As shown in FIG. 2, the piston 61 is provided with a peripheral annular groove in which is disposed an O-ring 73 which, upon a chosen amount of upward travel of the piston 61 and indicating stem 62 against the yielding resistance of the spring 69, subsequent to unseating of the valve element 65 from its seat 59, abuts a conical surface 74 formed on the interior of the body 48. Fluid under pressure acting on the lower face of the piston 61 forces the O-ring 73 against the conical surface 74 so that this O-ring forms a seal therewith to thereby prevent flow of fluid under pressure from below the piston to atmosphere via counterbore 51 and insect excluder device 72.

The outlet or downstream side of the choke or restriction 7 is connected by a pipe 75 to the inlet of the fluid flow measuring device 8.

The flow measuring device 8 comprises a closing member or valve element in the form of a flexible diaphragm that is forced against an annular seat to close a passageway through the valve body of this device. The device 8 further comprises a by-pass communication for establishing a limit rate of flow of fluid under pressure around the valve element while it is in its closed position. Disposed in this by-pass communication is a tapered metering tube having at its lower or smaller end a choke above which is disposed a ball float. A stop in the upper end of the tube limits upward movement of the float.

Fluid under pressure acting below the ball forces it upward in the outwardly-flaring tapered tube. The distance the ball is moved upward corresponds to the quantity or amount of fluid under pressure flowing through the tube. Accordingly, intermediate its ends, the tube is marked with a condemning line. Therefore, when the float is moved upward to a position below or in alignment with the condemning line, this is an indication to an observer that the fluid pressure leakage of the car brake system is within permissible limits. If the ball is moved to a position above the condemning line, this is an indication that the car brake system leakage is excessive and the brake equipment is not satisfactory for use.

The outlet of the flow measuring device 8 is connected by a pipe 76 to a hose coupling 77. This hose coupling 77 may be coupled to and uncoupled from an identical hose coupling 78 at one end of a hose 79 that extends from one of the usual angle cocks 80 carried at the respective opposite ends of the car brake pipe 81 that extends from end to end of the car.

The car brake pipe 81 may be made up of two or more sections of pipe the adjacent ends of which are secured together by welding. In the performance of the welding operation, it sometimes occurs that the molten metal from the welding rod used adheres to the inside wall of the pipe and thereafter solidifies thereby reducing the cross-sectional area of the pipe opening and thus forming a restriction at the juncture of the two pipes, one such a restrictiton being shown in the brake pipe 81 and denoted in FIG. 1 by the reference numeral 82. It is apparent that one or more such restrictions in the brake pipe 81 is effective to reduce the rate of flow of fluid under pressure through the brake pipe.

To effect charging of the brake pipe 81 and the brake equipment on the single car, the test apparatus constituting the present invention is connected, as shown in FIG. 1 of the drawing, between the charging plant and one end of the brake pipe 81 on the car. Assume that the handle 24 and the rotary valve 17 now occupy their No. 1 position in which they are shown in FIG. 1.

As will be seen in FIG. 3, with the handle 24 in position No. 1, the drilled hole 33 in the rotary valve 17, the diameter of which hole may be, as aforestated, .1875 inch, is effective to supply fluid at the maximum charging rate and at the pressure for which the reducing valve device 3 is set which, for example, may be 70 pounds per square inch, from the chamber 16 to the passageway and pipe 31 and thence to the brake pipe 81 on the car via the choke or restriction 7, pipe 75, the flow measuring device 8 the valve element or diaphragm of which it may be assumed can be unseated from its annular seat, pipe 76, hose couplings 77 and 78, hose 79, and angle cock 80 which may be assumed to occupy its open position. Thus, the brake pipe 81 can be charged to the pressure for which the reducing valve device 3 is set, which, as stated above, may be, for example, 70 pounds per square inch.

Let it now be assumed that either the restriction 82 is of such size as to prevent the flow of fluid under pressure though the brake pipe 81 at an emergency rate, or the size of the restriction 82 and the size of one or more other restrictions (not shown) in the brake pipe 81 between the opposite end of the car is such that these plurality of restrictions prevent the flow of fluid under pressure through the brake pipe 81 from one end of the car to the other at an emergency rate.

It is apparent that the above-mentioned restriction or restrictions, and also any abnormal bend or twist in the hose 79 or any passageway in the angle cock 80 which is substantially less in size than that desired, will retard the flow of the fluid under pressure being supplied to effect charging of the car brake pipe 81. Accordingly, it will be apparent that this retardation of the flow of fluid under pressure to charge the car brake pipe 81 is effective to increase the pressure in the pipes 31, 46 and 56 on the upstream side of the choke or restriction 7, it being understood of course that the greater the restrictions to the flow of fluid under pressure through the car brake pipe 81 the greater will be the pressure in the pipes 31, 46 and 56.

The strength of the spring 69 (FIG. 2) in the brake pipe restriction indicator 6 is selected to be such that the piston 61 and the valve element 65 will be moved upward against the yielding resistance of this spring from the position shown in FIG. 2 upon the area of the valve element 65 within the annular valve seat 59 being subject to a pressure corresponding to the pressure obtained in the pipes 31, 46 and 56 and on the upstream side of the choke or restriction 7 when the total restrictions to flow of fluid under pressure through the car brake pipe 81 are sufficient to prevent flow of fluid under pressure through this brake pipe 81 at an emergency rate.

Consequently, it will be apparent from the foregoing that when the car brake pipe 81 is sufficiently restricted to prevent flow of fluid under pressure therethrough from one end of the car to the other at an emergency rate, the pressure obtained in the pipes 31, 46 and 56 and acting on the area of the valve element 65 within the annular valve seat 59 will be sufficient to move the valve element 65, piston 61 and indicating stem 62 upward against the yielding resistance of the spring 69 so that the valve element 65 is lifted upward from its seat 59.

Upon the valve element 65 being lifted upward from its seat 59, the entire lower face of the piston 61 is subject to fluid under pressure in the pipes 56, 46 and 31. Even though the piston 61 is not provided with an O-ring to form a seal with the wall surface of the bushing 60, the flow of fluid under pressure between the periphery of the piston 61 and the wall surface of the bushing 60 will not be great enough to prevent a rapid increase in the pressure acting over the entire area of the lower face of this piston subsequent to unseating of the valve element 65 fom its seat 59. Accordingly, the piston 61 and the indicating stem 62 will be moved upward with a snap action until the O-ring 73 carried by the piston 61 abuts the conical surface 74 and forms a seal therewith to prevent the escape of fluid under pressure from beneath the piston 61. In this position of the piston 61 and the indicating stem 62 the upper end of this stem extends a substantial disttance above the top of the body 48 to indicate to an observer that the brake pipe restriction indicator 6 has been operated to its indicating position and thus apprise him of the fact that the brake pipe 81 on the car is restricted to such an extent that flow of fluid under pressure therethrough at an emergency rate cannot be obtained. Therefore, such steps as may be necessary can be subsequently taken to eliminate the restrictions in the car brake pipe 81 before the car is placed in service, or the test discussed below are made.

It is apparent from FIG. 2 that, while the O-ring 73 carried by the piston 61 forms a seal with the conical surface 74 on the body 48, fluid under pressure from the pipes 31, 46 and 56 is acting on a larger area than is the case while the valve element 65 is seated on the annular valve seat 59. Accordingly, subsequent to the O-ring 73 carried by the piston 61 forming a seal with the conical surface 74, a drop in the pressure in the pipes 31, 46 and 56 to a value substantially below the pressure in these pipes at the time the valve element 65 was unseated from the valve seat 59 is necessary before the spring 69 is rendered effective to return the piston 61 to its original position in which the valve element 65 carried thereby is reseated on its seat 59.

The emergency cock or valve device 5, the fluid pressure flow measuring device 8, and positions Nos. 2, 3, 4, 5 and 6 of the handle 24 and rotary valve 17 of the rotary valve device 1 are used in the test apparatus constituting the present invention to perform the same tests or make the same general check of the condition of the brake equipment on the car having the brake pipe 81 as can be now made by use of the well-known single car testing device used extensively on American railroads. Since these tests constitute no part of the present invention and are entirely independent of the test to determine if the restrictions in the car brake pipe are great enough to prevent the flow of fluid under pressure therethrough at an emergency rate, a detailed description of these additional tests that can be performed with the test apparatus shown in FIG. 1 is not believed necessary. It should be noted, however, that the test apparatus shown in FIG. 1 is capable of performing all of the tests on the fluid pressure brake equipment on a single car as can be performed by use of the above-mentioned well-known single car testing device. Consequently, it will be understood that the test apparatus shown in FIG. 1 embodies therein all of the structure of the well-known single car testing device and such additional structure as is necessary to enable this test apparatus to determine that the brake pipe extending from end to end of a single car is restricted to such an extent that flow of fluid under pressure therethrough at an emergency rate cannot be obtained.

Having new described the invention, what I claim as new and desire to secure by Letters Patent, is:

1. A modified single railway car brake equipment testing apparatus of the type comprising a feed valve device for supplying fluid under pressure at a selected chosen constant pressure, a manually operative multi-position rotary valve device for controlling supply of fluid under pressure from the feed valve device to a brake pipe on the car and subsequent venting of fluid under pressure from the brake pipe to atmosphere, an emergency valve device manually operative to vent fluid under pressure fom the bake pipe at an emergency rate, and a fluid pressure flow measuring device for measuring the rate of charging flow of fluid under pressure to hte bake pipe, wherein the improvement comprises:
 (a) choke means interposed in a fluid pressure communication extending between the rotary valve device and the fluid pressure flow measuring device,
 (b) a brake pipe restriction indicator subject to the pressure in the portion of said communication between the rotary valve and said choke means, and
 (c) pressure-responsive indicator means operative to an indicating position by the pressure established in said portion of said communication only in the event the car brake pipe is restricted sufficiently to prevent the discharge flow of fluid under pressure therethrough at an emergency rate.

2. A modified single railway car break equipment testing apparatus, as claimed in claim 1, wherein a choke having an orifice diameter of the order of .1875 inch is provided in the rotary valve of said multi-position rotary valve device through which choke charging of the brake pipe on the car is effected in the one position of the rotary valve, in which a test of the restriction of the brake pipe is effected.

3. A modified single railway car brake equipment testing apparatus, as claimed in claim 1, further characterized in that the orifice diameter of said choke means is of the order of .375 inch.

4. A modified single railway car brake equipment testing apparatus, as claimed in claim 1, wherein said pressure-responsive indicator means comprises:
   (a) a casing having a chamber to which the pressure in the portion of said communication between said rotary valve and said choke means is communicated,
   (b) piston means subject to the pressure in said chamber,
   (c) spring means yieldingly resisting movement of said piston out of a normal position responsive to the pressure in said chamber, and
   (d) a stem on said piston providing a visible indication when the pressure in the chamber causes the piston to move out of said normal position.

5. A modified single railway car brake equipment testing apparatus, as claimed in claim 1, wherein said pressure responsive restriction indicator means comprises:
   (a) two spaced-apart coaxial annular valve seats of different area,
   (b) a piston disposed intermediate said two valve seats and having an indicating stem thereon,
   (c) two valve elements carried by and disposed on the respective oppositte faces of said piston for cooperation respectively one at a time with a corresponding annular valve seat to prevent flow of fluid under pressure between opposite sides of said piston, and
   (d) spring means for normally biasing one of said valve elements to a seated position on the smaller of said annular valve seats so long as the fluid pressure acting on said one valve element within the area of said smaller valve seat is less than that obtained in the event the car brake pipe is restricted sufficiently to prevent the flow of fluid under pressure therethrough at an emergency rate,
   (e) the other of said valve elements being movable with a snap action to a seated position on the larger of said annular valve seats upon the fluid pressure force acting on said one valve element increasing to the value to cause unseating thereof from said amaller valve seat against the yielding resistance of said spring means,
   (f) said piston stem being visible to an observer only in the seated position of the other of said valve elements.

References Cited
UNITED STATES PATENTS

| | | | |
|---|---|---|---|
| 1,875,883 | 9/1932 | Nettleton | 116—55 |
| 2,126,355 | 8/1938 | Thomas | 116—70 |
| 2,379,308 | 6/1945 | McClure | 116—55 |
| 2,637,201 | 5/1953 | Meier | 73—39 |
| 2,954,751 | 10/1960 | Barnes | 116—70 |

S. CLEMENT SWISHER, Primary Examiner

W. A. HENRY II, Assistant Examiner

U.S. Cl. X.R.

303—1